United States Patent [19]

Cazzaniga et al.

[11] 4,292,989
[45] Oct. 6, 1981

[54] FIRE SAFE SEAL

[75] Inventors: Italo Cazzaniga; Ottorino Pasquinelli, both of Milan, Italy

[73] Assignee: Grove Valve and Regulator Company, Oakland, Calif.

[21] Appl. No.: 99,932

[22] Filed: Dec. 3, 1979

[30] Foreign Application Priority Data

Jun. 1, 1979 [CA] Canada .................................. 328898

[51] Int. Cl.³ .......................................... F16K 13/04
[52] U.S. Cl. ...................................... 137/72; 251/174
[58] Field of Search ......................... 137/72; 251/174

[56] References Cited

U.S. PATENT DOCUMENTS

| 2,929,606 | 3/1960 | Kaiser | 251/174 |
| 3,241,808 | 3/1966 | Allen | 251/174 |
| 3,346,234 | 10/1967 | Allen | 251/174 |
| 3,990,465 | 11/1976 | Allen | 137/72 |

Primary Examiner—Harold W. Weakley
Attorney, Agent, or Firm—Melvin R. Stidham

[57] ABSTRACT

A Fire Safe Seal for a valve having a metallic seat ring slidable in a cylindrical internal surface with an elastomer ring sealing between the seat ring and the internal surface. An elastomer seal ring or even a highly finished surface on the leading face effects a seal with the valve closure member. An emergency seal ring having a forwardly extending, sharp annular lip with an internal chamfer is engageable, when forced, over a complementary chamfer around the trailing end of the seat ring and into the clearance around the seat ring to seal it off. A spacer ring of a heat destructible material is interposed between the emergency seal ring and the seat ring to render the emergency ring inactive normally.

5 Claims, 3 Drawing Figures

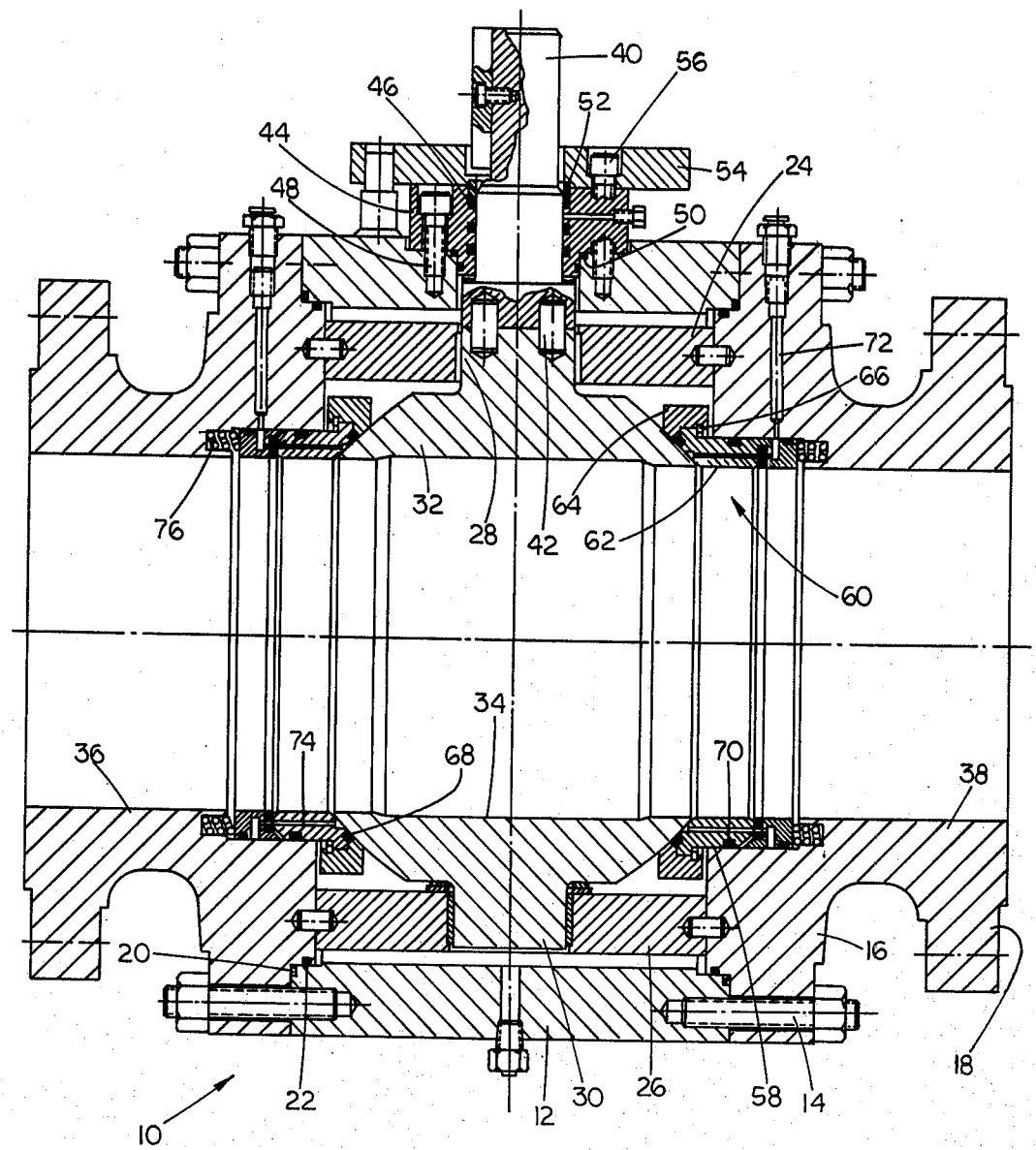
FIG.-1-

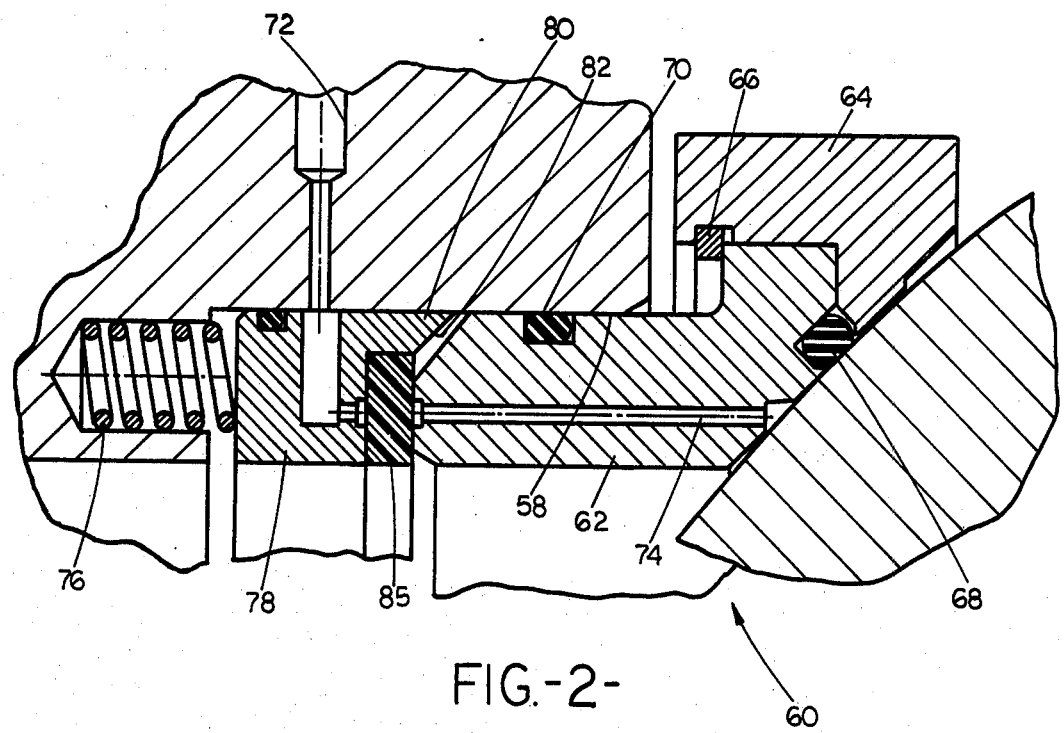
FIG.-2-
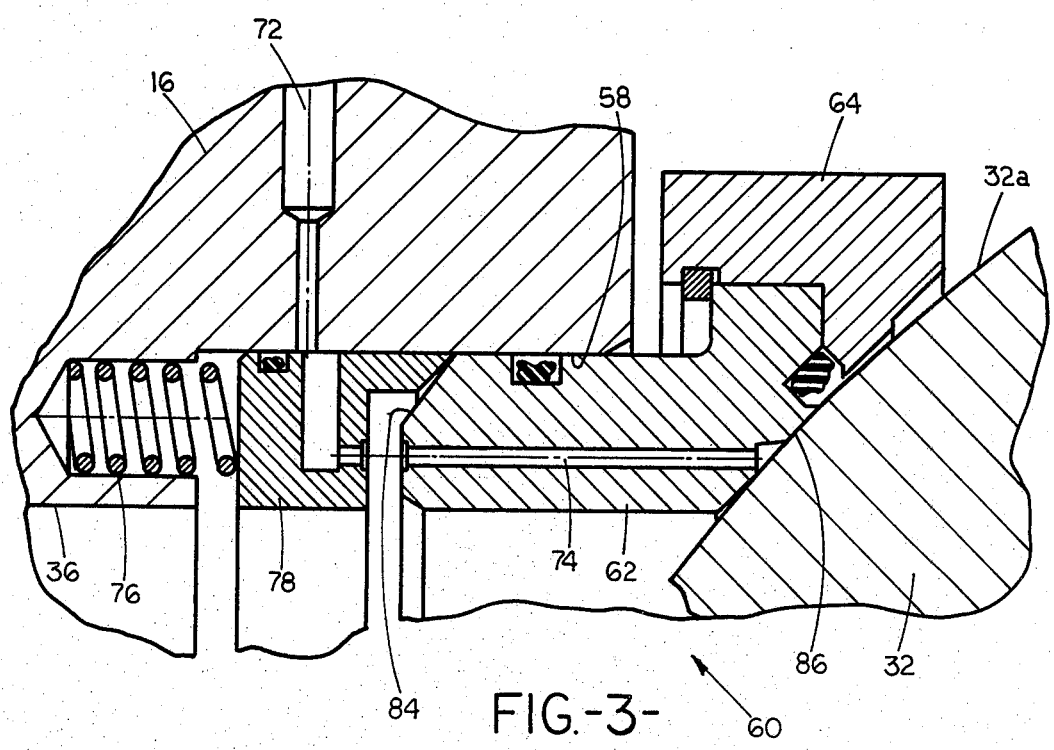
FIG.-3-

4,292,989

FIRE SAFE SEAL

BACKGROUND OF THE INVENTION

Valves for sealing liquids and gases often have resilient sealing members in order to effect a more fluid-tight seal. However, when used in pipelines conducting combustible materials, such seal members are subject to destruction at high temperatures and, in order to confine the fire, it is highly desireable to prevent flow of the fluid through the valve, even with the principal seals destroyed.

OBJECTS OF THE INVENTION

It is an object of this invention to provide a metallic seal for a valve which functions in the event the main, elastomer seals are destroyed.

It is a further object of this invention to provide a metallic emergency seal to effect a seal between a valve seat ring and the cylindrical surface in which it operates, which is effective only in the event that the main, elastomer seals are destroyed.

It is a further object of this invention to provide a metallic emergency seal to replace an elastomer seal ring around a metallic seat ring and means to keep the emergency seal inactive as long as the principal, elastomer seal is effective.

SUMMARY OF THE INVENTION

The Fire Safe Seal of this invention is intended for use in a valve having a closure member movable between open and closed position. A metallic seat ring, which is slidable in a cylindrical internal surface and which is spring biased toward the valve closure member, may have a recess in the leading face accommodating a resilient seal ring. In addition, the leading surface is finished to effect a metal to metal seal should it be biased against the closure member. A resilient seal ring seals between the cylindrical outer surface of the seat ring and the cylindrical internal surface in which it slides. An external chamfer is provided on a trailing end of the seat ring and an emergency seal ring is interposed between the spring biasing means and the back of the seat ring. The emergency seal ring has an annular sharp lip with an internal chamfer complementary to the external chamfer so that when forced against the seat ring it engages over the external chamfer to seal off the clearance, between the seat ring and the internal surface. Normally however, a spacer ring of a heat destructible material is interposed between the seat ring simply transmits spring and fluid pressure forces to the seat ring without engaging the chamfer. The spacer member is of a material having a melting point at or below that of the elastomer seal so that it too, will be destroyed in the event the elastomer seal is destroyed and allows the chamferred lip to engage over the external chamfer and into the clearance around the seat ring.

BRIEF DESCRIPTION OF THE DRAWINGS

In the drawings:

FIG. 1 is a section view of a ball valve including the fire safe seal of this invention;

FIG. 2 is a large partial section view showing the sealing means in normal sealing disposition; and FIG. 3 is a large partial section view showing activation of the emergency seal in the event of fire.

DESCRIPTION OF A PREFERRED EMBODIMENT

Referring now more particularly to FIG. 1, a ball valve 10 employing this invention may include a body band 12 which may be cast or rolled from a metal plate. Secured to the opposite annular ends of the body band 12, as by means of studs 14, are end closures 16 which include some means, such as flanges 18 for installation of the valve 10 into the pipeline (not shown). The valve body 10 is made fluid-tight, as by means of body seal rings 20 and 22.

Upper and lower bearing blocks 24 and 26 are clamped between the end closures 16 and rotatably receive trunions 28 and 30 which may be formed integrally with the valve ball 32. A flow passage 34 through the ball is aligned with the hub flow passages 36 and 38 when the ball is turned to the open position shown in FIG. 1. An operating stem 40 is coupled to the upper trunion 28 by means of pins 42 so that by turning the stem 40 through 90 degrees the ball may be moved between open and closed positions. The stem 40 is rotatably received in a stem seal block 44 and O-rings 46 carried therein seal around the stem 40. The block 44 is secured to the body band 12 as by means of cap screws 48 and O-rings 50 are provided to render its fluid-tight.

After a retainer ring 52 is placed to the retention of the upper O-ring 46 a valve operator adapter plate 54 is secured in place by means of cap screws 56. An internal cylindrical surface 58 in each end closure 16 slidably receives a seat ring assembly 60, which may be formed of inner and outer seat rings 62 and 64 which are held together by a snap ring 66 carried in a groove in the outer seat ring. An O-ring 68, which is carried in a recess or groove between the inner and outer seat rings 62 and 64 provide the main seal for sealing engagement with the ball 32. A tail O-ring 70 seals between the seat ring assembly 60 and the internal cylindrical surface 58. Lubrication ducts 72 and 74 may be provided through the end closures 16 and seat ring assembly 60.

A plurality of springs 76 around the end closures 16 bias the seat ring assembly 60 toward the ball and, in addition, the relative diameters of the main seal ring 68 and the tail O-ring 70 are such that, irrespective of the direction of pressure, the seat rings 60 are biased against the ball 32. That is, the sealing diameter of the main seal 68 is greater then the inner diameter of the tail seal O-ring 70, so that when the higher pressure comes from the outside the seat ring it will act inward, as far as the inner diameter of the tail O-ring, and hence, over a larger area at the rear to bias the seat ring forward. Similarly the main seal diameter is less then the outer diameter of the tail O-ring, so that when the higher pressure is from the flow passage 36 or 38 is will act outward to the outer diameter of the tail O-ring 70, again over a larger area to bias the seat ring forward.

Interposed between the seat ring 60 and springs 76 are emergency seal rings 78 which have forwardly extending lips 80 at the end of which are internal chamfers 82 which are adapted to engage and ramp up complementary chamfers 84 which are provided at the trailing end of the inner seat ring 62 so that when biased forward by the springs 76 aided by pressure, the sharp lip 80 will tend to ride up the chamfer 84 and wedge into and seal the space between the inner seat ring 62 and the internal cylindrical surface 58, which clearance is necessary to enable free sliding movement during normal sealing operation. The above-described actions of the emergency seal lip 80 is facilitated by forming the external taper 84 at a slightly greater angle than the internal taper 82. For example, satisfactory results have been achieved with the internal taper at 45 degrees and the external taper at 50 degrees so that the sharp lip 80 rides up a ramp 84 to seal.

In order to inactivate the emergency seal 78 during normal valve operation, there is provided a spacer ring 85 of a heat destructible material, such as Nylon or the like. In any event, the material selected must have a melting point sufficiently high to withstand the service for which the valve 10 is intended but it should have a melting point at or below that of the tail O-ring 70, so that when the tail O-ring fails, the spacer ring 84 will also be destroyed and the emergency seal ring 80 activated.

At the forward end of the seat ring assembly 60 the inner seat ring 62 is highly finished at 86 to form a reasonably effective metal to metal seal with the highly finished surface 32a of the ball 32. However, because a clearance is necessary to enable sliding of the inner seat rings 62 in the internal cylindrical surface 58, the emergency seal is necessary to provide an effective seal in the event of destruction of the tail O-ring 70, under extremely high temperatures, as in the case of a fire.

While this invention has been described in conjunction with a preferred embodiment thereof, it is obvious that modifications and changes therein may be made to those skilled in the art without departing from the spirit and scope of this invention, as defined by the claims appended hereto.

What is claimed is:

1. For a valve having a valve body, a closure member mounted in said body for movement between open and closed positions, a cylindrical, internal surface in said body adjacent to said closure member, a metallic seat ring slidable in said internal surface, the leading face of said seat ring being finished to seal off fluid flow when urged against said closure member, biasing means urging said seat ring against said closure member, and a resilient elastomer seal ring sealing between the outer surface of said seat ring and said internal surface; a fire-safe seal comprising:
   a metallic, emergency seal ring slidable in said internal surface and interposed between said seat ring and said biasing means;
   a sharp, internally chamferred, annular lip around the periphery of said emergency seal ring extending forwardly thereof;
   an external chamfer around the trailing end of said seat ring at the periphery thereof;
   said annular lip being receivable in the sliding clearance around said seat ring;
   said external chamfer being at a slightly greater angle than said internal chamfer so that when said emergency seal ring is driven forward said annular lip is cammed radially outward by said external chamfer into said sliding clearance; and,
   means to prevent operation of said emergency seal at temperatures below that which will destroy said elastomer seal ring.

2. The fire-safe seal defined by claim 1 wherein said last-named means comprises:
   a spacer member interposed between said emergency seal ring and said seat ring, said spacer member being of a heat destructible material.

3. The fire-safe seal defined by claim 2 wherein:
   said spacer member is of material having a melting point at or below that of said elastomer seal ring.

4. The fire-safe seal defined by claim 2 wherein:
   said spacer member is a ring interposed between said seat ring and said emergency seal ring.

5. The fire-safe seal defined by claim 3 wherein:
   said spacer member is of a material having a melting point sufficiently high for the service for which said valve is designed.

* * * * *